United States Patent [19]

Ichikawa et al.

[11] Patent Number: 4,563,130
[45] Date of Patent: Jan. 7, 1986

[54] MULTISTAGE PUMP-TURBINES

[75] Inventors: Kentaro Ichikawa, Chigasaki; Shunji Etoh, Yokohama, both of Japan

[73] Assignee: Tokyo Shibaura Denki Kabushiki Kaisha, Kawasaki, Japan

[21] Appl. No.: 583,361

[22] Filed: Feb. 24, 1984

[30] Foreign Application Priority Data

Feb. 28, 1983 [JP] Japan .................................. 58-32161
Feb. 28, 1983 [JP] Japan .................................. 58-32162

[51] Int. Cl.[4] .......................... F01D 5/06; B23K 31/02
[52] U.S. Cl. ........................... 416/213 R; 416/244 A; 415/198.1; 228/169
[58] Field of Search .......... 416/213 R, 244 A, 148 A, 416/244 R; 219/73.1; 228/48, 168, 169; 415/199.1, 199.2, 198.1

[56] References Cited

U.S. PATENT DOCUMENTS

| | | | |
|---|---|---|---|
| 2,174,380 | 9/1939 | Doran | 416/244 A X |
| 4,017,212 | 4/1977 | Gordienne et al. | 416/213 R X |
| 4,060,883 | 12/1977 | Coulon et al. | 219/73.1 X |
| 4,208,003 | 6/1980 | Meylan | 228/169 |

FOREIGN PATENT DOCUMENTS

| | | |
|---|---|---|
| 2734747 | 2/1979 | Fed. Rep. of Germany ... 416/213 R |
| 56-27073 | 3/1981 | Japan . |
| 56-115867 | 9/1981 | Japan . |

*Primary Examiner*—Robert E. Garrett
*Assistant Examiner*—Joseph M. Pitko
*Attorney, Agent, or Firm*—Schwartz, Jeffery, Schwaab, Mack, Blumenthal & Evans

[57] ABSTRACT

A turbine shaft structure of a multistage pump-turbine comprises at least two parts of upper and lower shaft parts generally connected at a runner portion of the highest pressure stage at which adverse external or internal effect is likely to be mostly applied. The runner portion of the highest pressure stage is provided with an axially vertical hole into which an upper end portion of the lower shaft part of the turbine shaft is inserted and the inserted upper end portion is welded to the wall of the vertical hole.

5 Claims, 5 Drawing Figures

MULTISTAGE PUMP-TURBINES

BACKGROUND OF THE INVENTION

This invention relates to a multistage hydraulic machine, and more particularly, a structure of a turbine shaft of a multistage pump-turbine for improving rigidity of the turbine shaft against bending stress.

A multistage pump-turbine is generally used when a head in a hydraulic power station increases and is over limitation of operation performance of a single-stage pump-turbine. From this point of view, especially, it has highly been required to provide a two-stage pump-turbine in which movable guide vanes and their control means are relatively easily assembled at the peripheral portions of runners of the respective pressure stages in comparison with the other multistage pump-turbines having more than two pressure stages.

With multistage pump-turbines of the type described above, the fixing of a plurality of runners on one turbine shaft includes troublesome assembling operations in comparison with a case where a single-stage pump-turbine is used, and when a multistage pump-turbine with small capacity is used, a plurality of runners are shrink-fitted on one turbine shaft to thereby transfer torque and support a bending moment caused by a radially horizontal unbalancing force applied on the runners. In a multistage pump-turbine with large capacity, however, the turbine shaft inevitably becomes heavy and elongated, which complicates operations such as transportation and assembling or disassembling operations.

In order to obviate these troublesome operations, there has been proposed a turbine shaft which is dividable into two or three parts, for example, in transportation, and assembled in actual field work.

Actually, in a conventional two-stage pump-turbine having a turbine shaft which consists of upper and lower portions, the runner of the high pressure stage is fixed by bolt means to the lower end of the upper shaft and the runner of the low pressure stage is fixed by bolt means to the lower shaft. The upper portion of the lower shaft is fitted into a connection hole formed at a runner cone of the high pressure stage and fixed by key members and bolt and nut means. In the other conventional shaft structure having upper and lower shaft portions and an intermediate shaft portion disposed therebetween, the runner of the low pressure stage is fixed by bolt means to a flanged portion of the intermediate shaft and also is fixed to the lower shaft by bolt means.

Since the multistage pump-turbine thus constructed is provided with a considerably long turbine shaft in comparison with that of a single-stage pump-turbine, there arises a problem in lowering a critical speed of the shaft system that shows the degree of stability against vibration force caused by the runners during operation. Particularly, with the highest pressure stage operated under the highest pressure and provided with a spiral casing having an asymmetric water passage with respect to the turbine shaft, a large hydraulic disequilibrium force is inevitably applied to the highest pressure stage in comparison with the other pressure stages, thus requiring the highest bending rigidity for the turbine shaft structure at the highest pressure stage. From this viewpoint, the turbine shaft structure, i.e. the connecting portions of the upper shaft part to the lower and intermediate shaft parts, of the conventional multistage pump-turbine cannot provide a sufficient bending rigidity against the hydraulic disequilibrium force.

SUMMARY OF THE INVENTION

An object of this invention is to provide a multistage pump-turbine having an improved turbine shaft structure in which connecting portions of the upper shaft part with the lower shaft part or the intermediate shaft part are strengthened for increasing a bending rigidity.

For achieving the above and other objects there is provided a multistage pump-turbine which is provided with a turbine shaft on which a plurality of runners, each provided with a runner crown and a runner cone, are assembled and the turbine shaft comprises at least two parts of upper and lower shaft parts connected at a runner portion of the highest pressure stage of the multistage pump-turbine. The runner portion of the highest pressure stage is provided with an axially vertical hole into which an upper end portion of the lower shaft part of the turbine shaft is inserted and the inserted upper end portion is welded to the wall of the vertical hole.

DETAILED DESCRIPTION OF THE INVENTION

To promote a full understanding of the exact nature of this invention, general aspects of a structure of a known turbine shaft of a multistage pump-turbine and various problems encountered with such a shaft will first be considered.

Figure 1:
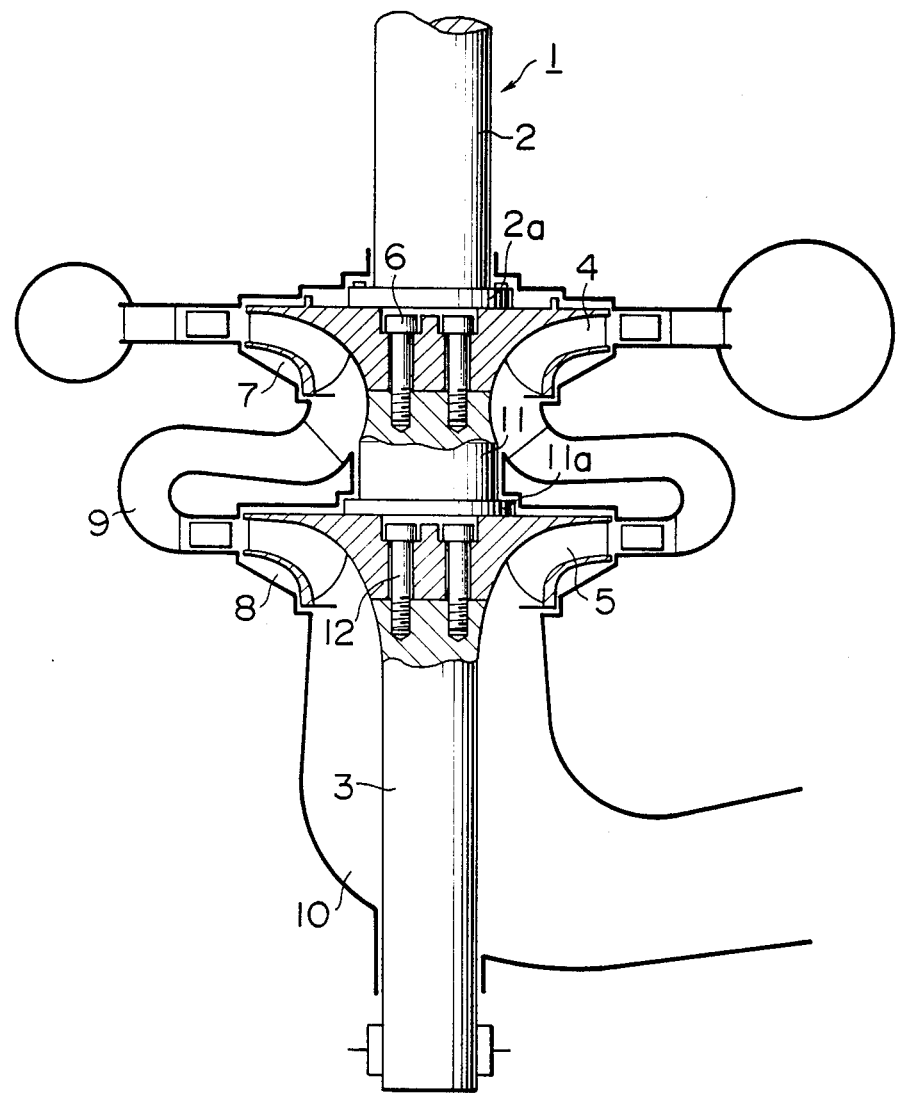
FIG. 1 shows a schematic view of a conventional two-stage pump-turbine partially in section for showing connecting portions of a turbine shaft structure.

FIG. 1 shows a conventional multistage (two pressure stage, in this example, for convenience sake) pump-turbine in which a turbine shaft 1 consists of three parts, i.e. upper shaft 2, lower shaft 3 and intermediate shaft 11 positioned between the upper and lower shafts. A runner 4 of the high pressure stage is clamped by bolt means to a flanged portion 2a formed at the lower end of the upper turbine shaft 2 and a runner 5 of the low pressure stage is shrinkagefitted on the intermediate turbine shaft 11, the upper end of which is clamped by bolt means 6 to the runner 4 of the high pressure stage. Furthermore, in this example, the runner 5 of the low pressure stage is bolted to a flanged portion 11a of the intermediate turbine shaft 11 and is also clamped by bolt means 12 to the upper end of the lower turbine shaft 3. Runner chambers 7 and 8 of the runners 4 and 5 are communicated with each other through a return passage 9 and the runner chamber 8 of the runner 5 of the lower pressure stage is connected to an elbow-shape draft tube 10.

Since the multistage pump-turbine thus constructed is provided with a considerably long turbine shaft in comparison with that of a single-stage pump-turbine, it is essentially required to raise the critical speed of the shaft system by increasing rigidity of shaft structure in order to stabilize the turbine shaft system against vibration force caused by the runners during the operation. Particularly, with the high pressure stage operated under the highest pressure and provided with a spiral casing including asymmetric water passage with respect to the turbine shaft, a large hydraulic disequilibrium force is inevitably applied to this high pressure stage in comparison with the other pressure stage, thus requiring an improved bending rigidity for the turbine shaft structure against the external or internal force at the high pressure stage. From this viewpoint, the connecting portions of the upper shaft part to the lower shaft part and/or the intermediate shaft part, which are connected by bolt means, of the conventional multistage pump-turbine cannot provide a sufficient bending rigidity against the hydraulically disequilibrium force.

Figure 2:
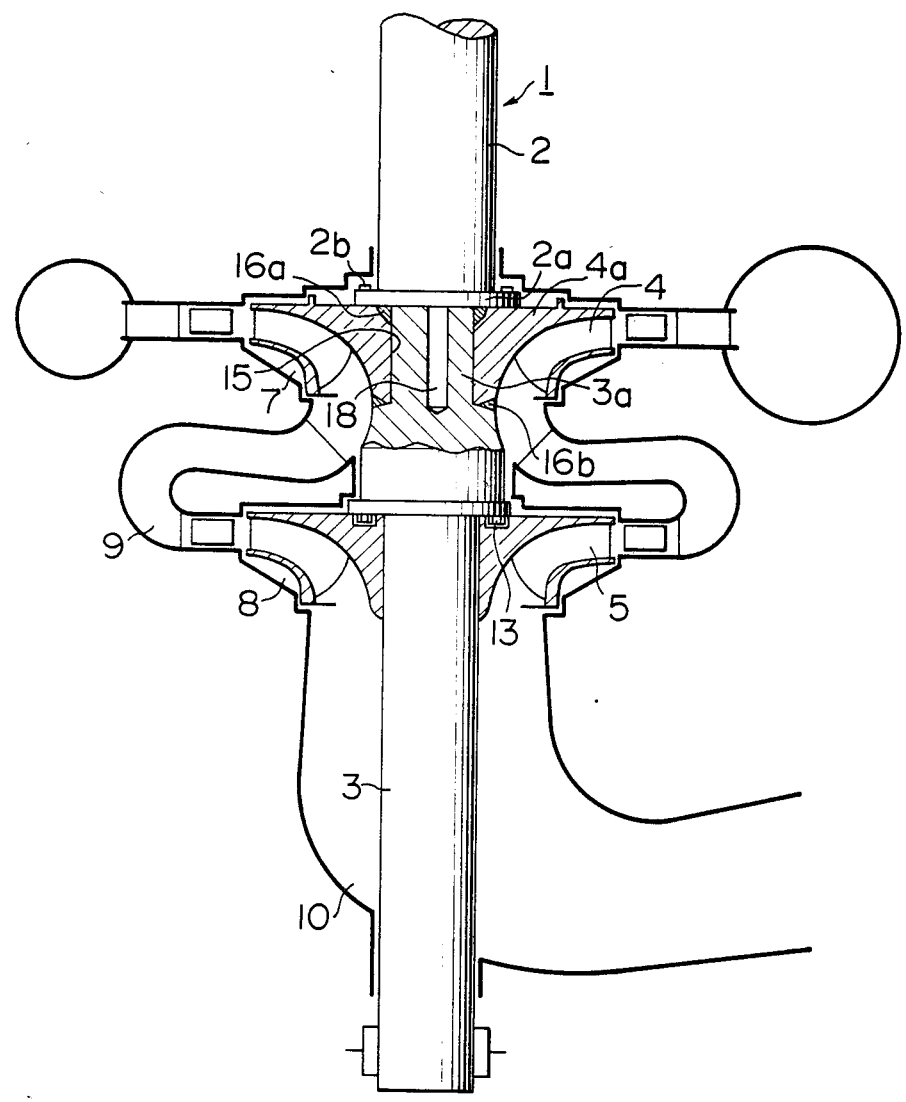
FIG. 2 shows a schematic view of a two-stage pump-turbine provided with a turbine shaft structure, partially in section, connected by one embodiment of this invention.

FIG. 2 shows one embodiment of a multistage (two pressure stage, for convenience sake) pump-turbine provided with an improved turbine shaft structure according to this invention, in which a turbine shaft 1 consists of two parts, i.e. upper and lower turbine shaft parts 2 and 3. To the lower end of the upper shaft 2 is formed a flanged portion 2a which is clamped by bolts 2b to a runner crown 4a of a runner 4 of the high pressure stage and a runner 5 of the low pressure stage is fixed by bolts 13 on the lower shaft 3.

The lower shaft 3 is provided at its upper end with a mount portion 3a which can be fitted into a connection hole 15 formed to the runner cone of the runner 4 of the high pressure stage. Under these conditions, welding is carried out along a welding bead 16a at the periphery of the upper end of the mount portion 3a and along a welding bead 16b between the runner cone of the runner 4 and the lower turbine shaft 3. TIG (Tungsten Inert Gas) welding is preferred for these welding operations, but arc-welding can also be utilized. At the welding operation, generally, since a welding strain is generated, a hole, for example a fine straight hole, 18 is formed in the mount portion 3a along the central axis thereof for absorbing the welding strain.

Figure 3:
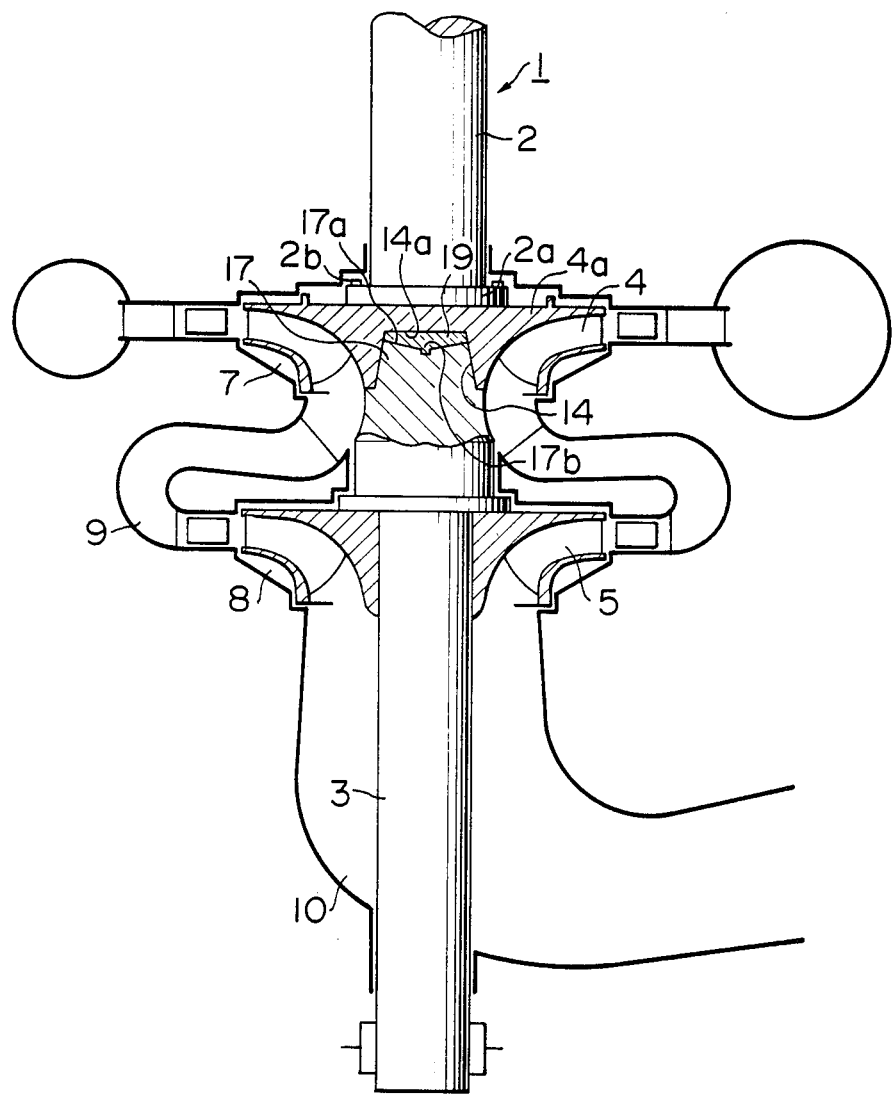
FIG. 3 shows a schematic view of a two-stage pump-turbine provided with a turbine shaft structure, partially in section, connected by the other embodiment of this invention.
Figure 4:
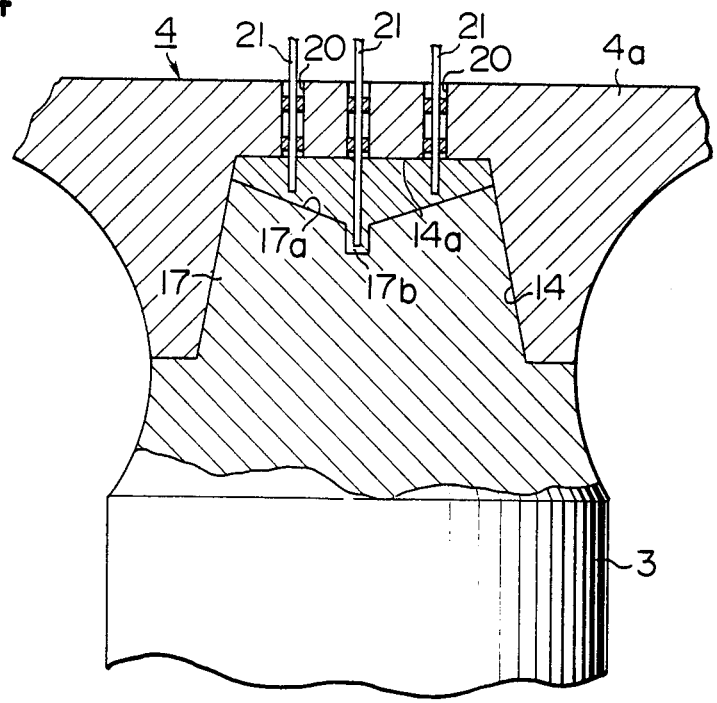
FIGS. 4 and 5 show vertical sectional views of connecting portions of the turbine shaft representing one mode of welding operation to be carried out for the embodiment shown in FIG. 3.
Figure 5:
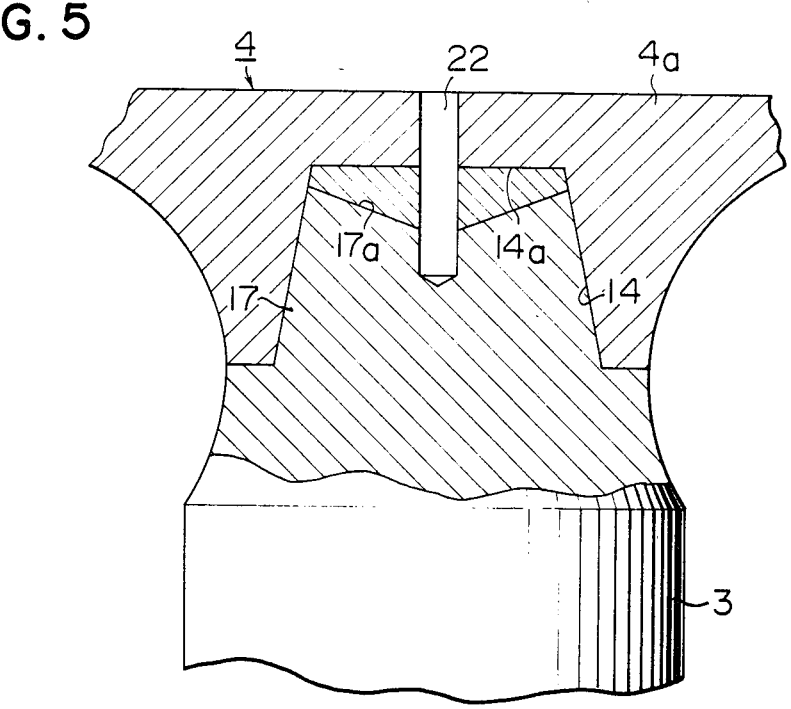

FIGS. 3 through 5 show another embodiment of the multistage (two pressure stage, for convenience sake) pump-turbine provided with an improved turbine shaft structure according to this invention, in which like reference numerals are added to parts corresponding to those shown in FIGS. 1 and 2 and details thereof are omitted herein.

Referring to FIG. 3, the runner cone of the runner 4 is provided with a bottomed hole 14, tapered inwardly and having a bottom 14a, into which a tapered upper end mount portion 17 of the lower turbine shaft 3 can be fitted tightly. The top end face 17a of the tapered end 17 has an inwardly tapered configuration corresponding to the tapered wall of the hole 14 and has a central recess 17b to form a space between the end face 17a and the bottom 14a of the tapered hole 14 as a welding space which is to be filled with welding slag, and in FIG. 3, a welded metal 19 formed by solidified welding slag is shown.

In connection with FIG. 3, FIG. 4 shows a mode for carrying out an electroslag welding, in which a plurality of, three, for example, electrode rods 21 are inserted into the space filled with the welding slag through three electrode insertion holes 20 formed in the runner crown 4a of the runner 4 so that the inserted front end of the central electrode rod 21 is positioned in the recess 17b to thereby act as an arc starting electrode rod and the other two electrode rods 21 are used as welding electrode rods. Under these conditions, when the electroslag welding is carried out, the inserted tapered end portion 17 is pulled further inwardly of the tapered hole 14 due to transformation shrinkage of molten slag at the welding operation to thereby attain a wedging effect and provide a firm engaged condition between the tapered end portion 17 of the lower shaft 3 and the tapered hole 14 of the runner crown 4a of the runner 4 of the high pressure stage.

In order to absorb welding strain due to the welding transformation caused at a time of the electroslag welding, a vertical welding strain absorbing hole 22 is formed to the runner crown 4a and the upper end 17 of the lower shaft 3 as shown in FIG. 5.

With these embodiments, as described with reference to FIG. 1, the runner 5 of the low pressure stage is also shrink-fitted on the lower shaft 3 and bolted thereto and the runner chamber 7 of the runner 4 is connected to the runner chamber 8 of the runner 5 through a return passage 9. As elbow-shape draft tube 10 is connected to the downstream side of the runner chamber 8.

It will of course be understood by those skilled in the art that, although the foregoing describes a turbine shaft structure consisting of upper and lower shaft parts of two-stage pump-turbine, the present invention can be applied to a turbine shaft structure having upper, lower and intermediate shaft parts and also applied to a multistage pump-turbine having more than two pressure stages. In addition, although the object of this invention can be sufficiently achieved by carrying out the welding operation on the connecting portion between the upper and the lower (or intermediate) turbine shaft parts, the welding operation can also be made at the connecting portion between the lower and intermediate turbine shafts.

What is claimed is:

1. A multistage pump-turbine provided with a turbine shaft on which a plurality of runners, each provided with a runner crown and a runner cone, are assembled, said turbine shaft comprising at least two parts of upper and lower shaft parts connected at a runner portion of a highest pressure stage of the multistage pump turbine, said runner portion of the highest pressure stage being provided with an axially vertical hole into which an upper end portion of the lower shaft part of said turbine shaft is inserted, said inserted upper end portion being welded to a wall of said vertical hole, said vertical hole being formed throughout the runner cone and the runner crown of the runner portion of the highest pressure stage, said upper end portion of the lower shaft part being provided with a welding strain absorbing hole along the axis thereof.

2. The multistage pump-turbine according to claim 1 wherein tungsten inert gas welding is carried out between said inserted upper end portion of the lower shaft and the upper and lower portions of the wall of said vertical hole.

3. A multistage pump-turbine provided with a turbine shaft on which a plurality of runners, each provided with a runner crown and a runner cone, are assembled, said turbine shaft comprising at least two parts of upper and lower shaft parts connected at a runner portion of a highest pressure stage of the multistage pump turbine, said runner portion of the highest pressure stage being provided with an axially vertical hole into which an upper end portion of the lower shaft part of said turbine shaft is inserted, said inserted upper end portion being welded to a wall of said vertical hole, said axially vertical hole being a bottomed inwardly tapered hole formed in the runner cone of the runner portion of the highest pressure stage, said upper end portion of the lower shaft part having an inwardly tapered configuration corresponding to a tapered wall of said tapered vertical hole so as to form a space between the bottom of said tapered hole and the top end surface of said upper end portion of the lower shaft part as a welding space, and defining with said runner crown a welding strain absorbing hole formed through said runner crown and said upper end portion of the lower shaft part.

4. The multistage pump-turbine according to claim 3 wherein electroslag welding is carried out in said welding space.

5. The multistage pump-turbine according to claim 3 wherein said top end surface of the lower shaft part is inwardly tapered and provided with a recess at a central portion thereof.

* * * * *